(12) United States Patent
Gutierrez et al.

(10) Patent No.: US 6,595,698 B2
(45) Date of Patent: Jul. 22, 2003

(54) HIGH DENSITY FIBER TERMINATOR/CONNECTOR

(75) Inventors: Roman Carlos Gutierrez, La Crescenta, CA (US); Tony Kai Tang, Glendale, CA (US)

(73) Assignee: Siwave, Inc., Arcadia, CA (US)

( * ) Notice: Subject to any disclaimer, the term of this patent is extended or adjusted under 35 U.S.C. 154(b) by 0 days.

(21) Appl. No.: 09/855,406

(22) Filed: May 15, 2001

(65) Prior Publication Data

US 2001/0051028 A1 Dec. 13, 2001

Related U.S. Application Data

(60) Provisional application No. 60/211,192, filed on Jun. 13, 2000.

(51) Int. Cl.[7] ............................................... G02B 6/36
(52) U.S. Cl. .......................................................... 385/85
(58) Field of Search ............................... 385/85, 89, 115

(56) References Cited

U.S. PATENT DOCUMENTS

| | | | | |
|---|---|---|---|---|
| 5,294,790 A | * | 3/1994 | Ohta et al. ................. | 250/216 |
| 5,346,583 A | * | 9/1994 | Basavanhally ............ | 156/273.3 |
| 5,355,429 A | * | 10/1994 | Lee et al. ................... | 385/134 |
| 5,394,498 A | | 2/1995 | Hinterlong et al. ......... | 385/115 |
| 5,550,942 A | | 8/1996 | Sheem ........................ | 285/53 |
| 5,566,262 A | | 10/1996 | Yamane et al. .............. | 385/33 |
| 5,769,698 A | * | 6/1998 | Chudoba et al. ............ | 269/287 |
| 5,892,870 A | | 4/1999 | Fingler et al. .............. | 385/134 |
| 5,907,650 A | | 5/1999 | Sherman et al. ............ | 385/80 |
| 6,078,714 A | * | 6/2000 | Cavanaugh .................. | 385/115 |
| 6,215,114 B1 | * | 4/2001 | Yagi et al. .................. | 250/216 |
| 6,328,482 B1 | * | 12/2001 | Jian ............................. | 385/88 |
| 6,396,995 B1 | * | 5/2002 | Stuelpnagel et al. ........ | 385/136 |
| 2001/0010745 A1 | * | 8/2001 | Lowry et al. ............... | 385/115 |

FOREIGN PATENT DOCUMENTS

| | | |
|---|---|---|
| EP | 0 482 673 A2 | 4/1992 |
| EP | 0 482 673 A3 | 4/1992 |
| FR | 2 767 388 | 2/1999 |
| JP | 08327486 | 12/1996 |
| JP | 10111426 | 4/1998 |

OTHER PUBLICATIONS

Kovacs et al. "Bulk Micromachining of Silicon". Proceedings of the IEEE, vol. 86, No. 8, Aug. 1998, pp. 1536–1550.
Sheem et al., "Face–Lock Optical Fiber Connector Design and Fabrication"; 1997 Electronic Components and Technology Conference; Berkeley Optics Company, Livermore, CA.

* cited by examiner

*Primary Examiner*—Tulsidas Patel
*Assistant Examiner*—Hae Moon Hyeon
(74) *Attorney, Agent, or Firm*—Fish & Richardson P.C.

(57) ABSTRACT

A high density fiber terminator/connector and methods of making the high density fiber terminator/connector are provided. One method comprises using deep reactive ion etching to etch a plurality of holes through a silicon substrate, wherein each hole is sized to fit an optical fiber; placing an optical fiber in at least one hole; removing portions of the fibers such that one end of each fiber is substantially even with one side of the substrate; polishing a surface of the ends of the fibers and the side of the substrate that are substantially even; and forming a coating on the surface of the ends of the fibers and the side of the substrate that are substantially even.

11 Claims, 5 Drawing Sheets

HIGH DENSITY FIBER TERMINATOR/CONNECTOR

CLAIM OF PRIORITY

The present application claims priority to U.S. Provisional Application No. 60/211,192, entitled "High Density Fiber Termination/Connector," filed on Jun. 13, 2000, assigned to the Assignee of the present application, and is hereby incorporated by reference in its entirety.

BACKGROUND OF THE INVENTION

1. Field of the Invention

The present invention relates to fiber optic terminators/connectors, and more particularly to a high density fiber terminator/connector.

2. Description of the Related Art

Common fiber optic terminations/connectors terminate one fiber at a time. There are several connector styles (e.g., FC/PC, LC), but in all cases, a single fiber is inserted and glued in a precision ferrule, which is typically made of ceramic. The end of the ferrule and fiber are polished together to provide a smooth surface or a desired shape.

When multiple fibers are connected together, each fiber is terminated with an FC/PC connector as described, and the fibers are connected together one pair at a time. This process is extremely time-consuming and costly when connecting a large number of fibers together.

State of the art high density fiber connectors use micro-machined v-grooves in which the fibers are located in v-shaped channels. This technology results in linear arrays of fibers, where the relative positioning of the fibers is limited by the fabrication precision (or imprecision) of the fiber v-grooves and by a diameter uniformity (or non-uniformity) of the fibers. When v-grooves are stacked to provide two-dimensional arrays of fibers, the relative position accuracy is further reduced and results in increased insertion loss in the connection of two such arrays.

SUMMARY OF THE INVENTION

A high density fiber terminator/connector and methods of making the high density fiber terminator/connector are provided in accordance with the present invention. One method uses silicon micro-machining to terminate multiple fibers simultaneously. This simplifies the process and improves the alignment of connecting multiple fibers together or positioning multiple fibers together to free-space optical elements.

One method uses Deep Reactive Ion Etching (DRIE) to make precise holes in a silicon wafer. The holes in the silicon may be arranged in any desired pattern by using, for example, a mask fabrication process with electron-beam writing of the mask, such as photolithography masking. A single photolithographic mask provides extremely high precision location positioning, and the relative position of each fiber in the holes can be accurately controlled. The accuracy in the relative positioning of the fibers ensures that all fibers are simultaneously aligned. Thus, photolithographic masking and deep reactive ion etching enable the fabrication of connectors for a plurality of fibers. Photolithographic masking and deep reactive ion etching also allow multiple fibers to be accurately aligned to free-space optical components.

One aspect of the invention relates to a method of making an optical fiber terminator. The method comprises using deep reactive ion etching to etch a plurality of holes in a silicon substrate, wherein each hole is sized to fit an optical fiber; and placing an optical fiber in at least one hole.

Another aspect of the invention relates to an optical fiber terminator in an optical switch. The optical fiber terminator comprises a silicon substrate with a plurality of holes formed by deep reactive ion etching, wherein each hole is sized to fit an optical fiber.

Another aspect of the invention relates to an optical fiber terminator with holes formed to allow insertion of fibers at an angle with respect to the substrate surface.

Another aspect of the invention relates to a method of making an optical fiber terminator. The method comprises etching a plurality of holes in a silicon substrate, wherein each hole is sized to fit an optical fiber; forming a plurality of flaps in the substrate around each hole, the flaps being configured for kinematic alignment of an optical fiber in each hole; and placing an optical fiber in at least one hole.

Another aspect of the invention relates to an optical fiber terminator, which comprises a silicon substrate. The silicon substrate comprises a plurality of holes etched in the silicon substrate, wherein each hole is sized to fit an optical fiber. The silicon substrate also comprises a plurality of flaps formed in the substrate around each hole. The flaps are configured for kinematic alignment of an optical fiber in each hole.

DETAILED DESCRIPTION

Figure 1:
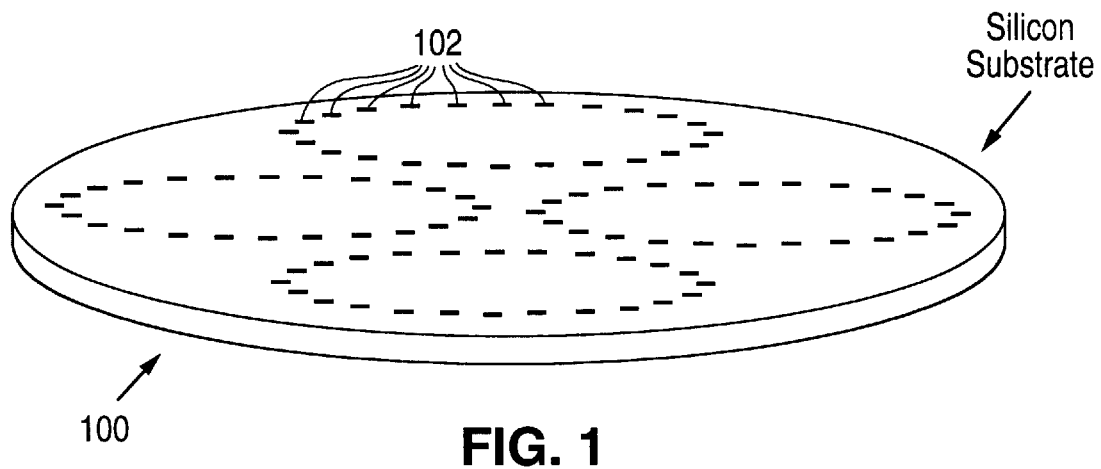
FIG. 1 illustrates one embodiment of an array of holes etched into a silicon wafer/substrate.

FIG. 1 illustrates one embodiment of an array of holes 102 (referred to herein individually or collectively as '102')

etched into a silicon wafer/substrate 100. The substrate 100 may be between about 200 microns to about 650 microns in thickness. In one embodiment, the substrate 100 is 600 microns thick.

In one embodiment, the holes 102 are etched with Deep Reactive Ion Etching (DRIE) processes. The holes in the silicon substrate 100 may be arranged in any desired pattern by using, for example, a mask fabrication process with electron-beam writing of the mask, such as photolithography masking. A mask is a layer with openings in desired locations to expose an underlying material for etching. A single photolithographic mask provides extremely high precision location positioning. Masks written by electron-beam lithography typically have about 10 nm to 100 nm accuracy in positioning the locations of features in the mask. Thus, the relative position of each fiber in the holes can be accurately controlled.

The substrate 100 may have any number of holes 102 etched in any desired pattern. Each hole 102 is sufficiently sized to allow an optical fiber 200 (FIG. 2) to fit through the hole 102 (FIG. 1). In one embodiment, each hole is formed to closely match the diameter of an optical fiber, which is typically 125 microns.

Figure 2:
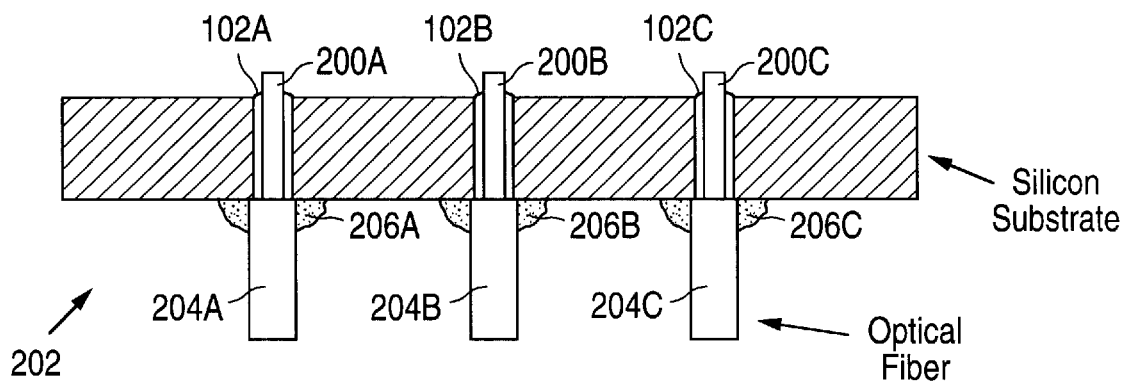
FIG. 2 illustrates one embodiment of a plurality of optical fibers inserted in a plurality of holes of a portion of the substrate of FIG. 1.

FIG. 2 illustrates one embodiment of a plurality of optical fibers 200A–200C (referred to herein individually or collectively as 'fiber 200') inserted in a plurality of holes 102A–102C of a portion of the substrate 100 of FIG. 1. In FIGS. 2–5 and 7–12, a small number of fibers and holes are shown, but the methods described herein may be applied to a very large number of fibers and holes.

A fiber (core plus cladding) 200 is typically about 125 microns in diameter. The core of a fiber 200 is typically about 9 microns in diameter, but the core is conventionally not easily separable from the cladding of the fiber 200 because both the core and the cladding are typically made out of glass. The coating or buffer 204 around the fiber 200 typically comprises plastic and may be separated from the fiber 200. The diameter of the buffer 204 is typically between 250 microns and 900 microns.

In one embodiment, each hole 102 in FIG. 2 provides a 5-micron space between an exterior surface (e.g., cylindrical) of a fiber 200 and the hole 102. Thus, one embodiment of the hole 102 is about 135 microns in diameter to provides a 5-micron space between an exterior surface (e.g., cylindrical) of a fiber 200 with a 25 micron diameter and the hole 102. Alternatively, if a fiber 200 is 125 microns in diameter, and each hole 102 is 130 microns in diameter, there is a 2.5-micron clearance on each side for the fiber 200 to pass through the hole 102. In another embodiment, if a fiber 200 is 125 microns in diameter, and each hole 102 is 127 microns in diameter, there is a 1-micron clearance on each side for the fiber 200 to pass through the hole 102. In one embodiment, at least 2 holes are about 10 to about 140 micros in diameter.

In one embodiment, each hole 102 is substantially cylindrical in shape. In other embodiments, each hole 102 may be non-cylindrical, such as a triangle, a rectangle or a pentagon.

The optical fibers 200A–200C in FIG. 2 are stripped (removing their buffer coating 204A–204C and exposing the bare fiber 200A–200C), a small amount of glue 206A–206C is applied to the fiber coatings 204A–204C, and the bare fibers 200A–200C are slipped into the holes 102A–102C in the silicon wafer 100. There are many types of glue that can be used, such as a thermal cure epoxy, which cures at 120 degrees Celsius from Epotek.

Figure 3:
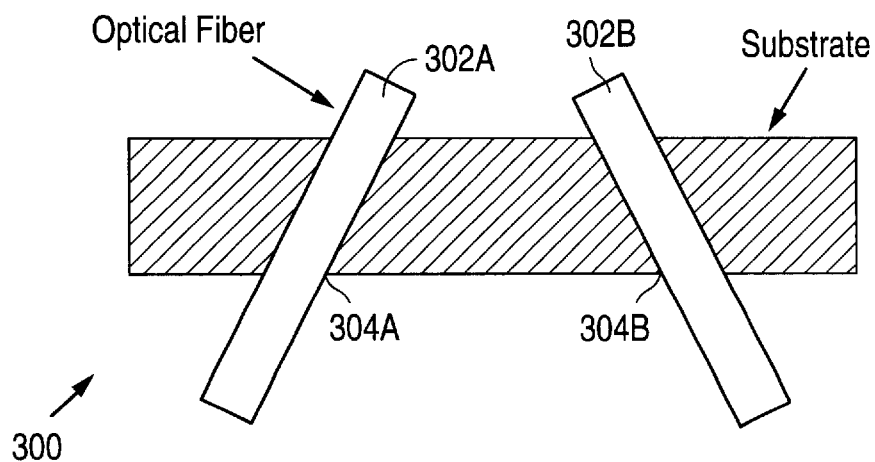
FIG. 3 illustrates one embodiment of angling a plurality of holes in a substrate to allow fibers to be positioned and pointed at a specific angle.

FIG. 3 illustrates one embodiment of angling a plurality of holes 304A–304B in a substrate 300 to allow fibers 302A–302B to be positioned and pointed at a specific angle. The holes 304A–304B in FIG. 3 may be formed with any suitable process, such as deep reactive ion etching. Each hole 304 may also contain micro-machined kinematic alignment mechanisms to position the optical fiber at the center of the hole 304. Micromachined kinematic alignment mechanisms are described herein and in the U.S. Provisional Application referenced above and incorporated by reference.

Figure 12:
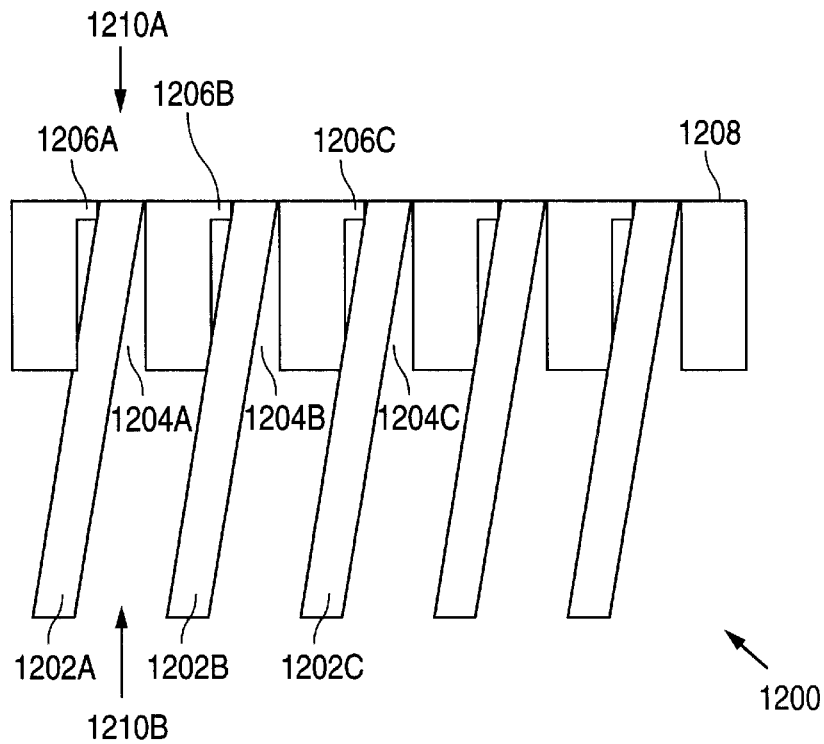
FIG. 12 illustrates one embodiment of an angled fiber array.

FIG. 12 illustrates one embodiment of an angled optical fiber array/terminator 1200. In FIG. 12, deep reactive ion etching forms a plurality of holes 1204A–1204C in the substrate. A front surface 1208 of the substrate may have a hole 1204 sized to fit an optical fiber 1202 and a locator 1206 at the edge of the slotted hole 1204 to position a fiber 1202 precisely on that surface 1208. In other words, each hole 1204 is sized to fit an optical fiber 1202 in one direction 1210A but oversized in another direction 1210B. Thus, each slotted hole 1204 allows a fiber 1202 to be inserted at an angle with respect to the substrate surface 1208.

The angled insertion of the fiber arrays 300, 1200 in FIGS. 3 and 12 provides low back-reflection, which is important when the fiber array 300 or 1200 is used as a termination into free-space (an unguided medium with a different optical index of refraction). Back-reflection may be further reduced by coating the fiber array 300 or 1200 with an anti-reflection coating. Terminating fibers 304A–304B and 1202A–1202C at an angle also allows a ball lens to collimate light, such that the collimated light comes out at an angle with respect to the substrate with low aberrations. If a graded index lens or aspheric lens is used, then it is important to tilt the lens with respect to the fiber array 300 or 1200 in order to provide collimated light with low aberrations.

In another embodiment, there are no locators 1206 near the front side, and loading (e.g., with other substrates or devices) is used to precisely position the fibers 1202A–1202C at an angle.

Figure 4A:
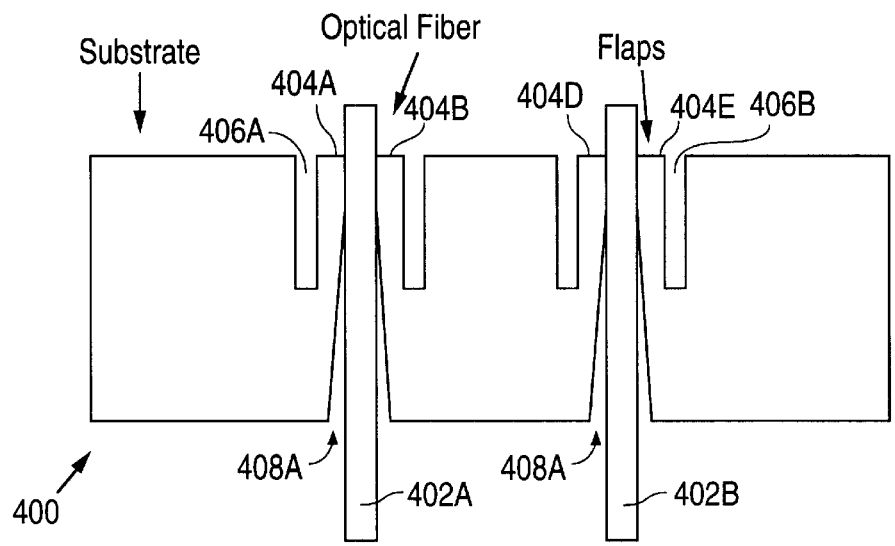
FIGS. 4A–4B illustrate one embodiment of a substrate with a plurality of holes and a plurality of vertical flaps positioned at an equal distance from each other around each hole.
Figure 4B:
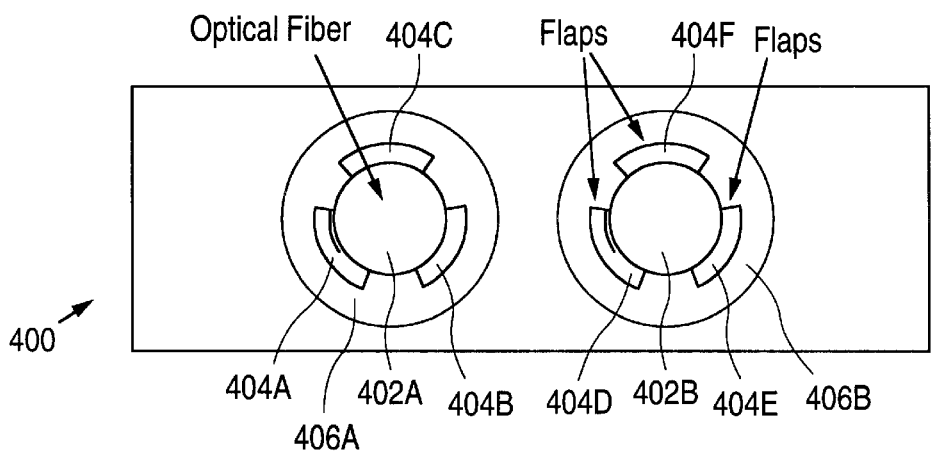

FIGS. 4A–4B illustrate one embodiment of a substrate 400 with a plurality of holes 408A–408B and a plurality of vertical flaps 404A–404F positioned at an equal distance from each other around each hole 408. FIG. 4B is a top view. Although three flaps 404A–404C, 404D–404F are shown for each hole 408A, 408B, there may be less than three or greater than three flaps for each hole 408A, 408B, in other embodiments. The flaps 404A–404F may be formed by deep reactive ion etching portions of the silicon wafer 400. The first set of flaps 404A–404C support a first fiber 402A equally and center the fiber 402A within the first hole 408A. Similarly, the second set of flaps 404D–404F support a second fiber 402B equally and center the fiber 402B within the second hole 408B. The flaps provide kinematic alignment or self-centering of a fiber 402 in a hole 408, which overcomes the problem of etching non-uniformities in the wafer 400.

In FIG. 4A, each hole 408 may be tapered to allow a fiber 402 to more easily slide into the hole 408. In another embodiment, each hole 408 in FIGS. 4A–4B is not tapered.

Figure 5:
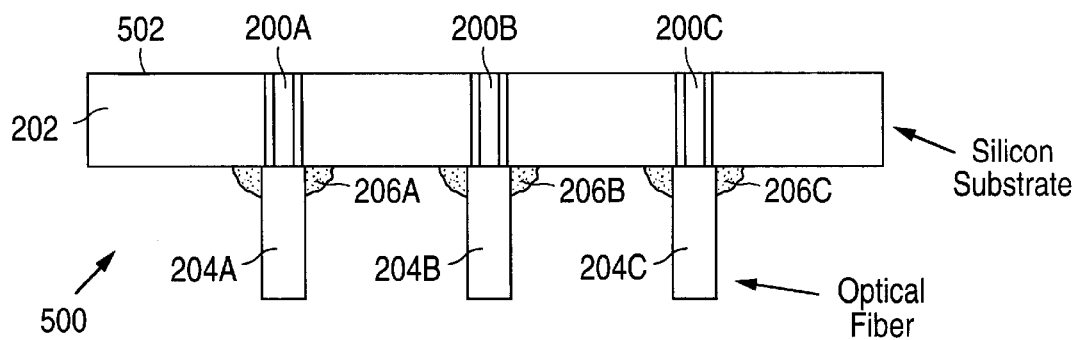
FIG. 5 illustrates the wafer of FIG. 2 with top ends of the fibers removed.

FIG. 5 illustrates the wafer 202 of FIG. 2 with top ends of the fibers 200A–200C removed, e.g., by cleaving or etching. The structure 500 in FIG. 5 may be referred to as a 'fiber array,' a 'fiber connector' or a 'fiber terminator.' In one embodiment, a top side 502 of the entire silicon wafer 202 in FIG. 5 and the glued fibers 200A–200C is polished by a lapping and polishing process. The lapping and polishing process may include the use of chemical mechanical polishing (CMP) slurries, or using polishing pads with Alumina grit of various sizes that are lubricated with water. Some polishing processes are known in the art, and some recipes are provided by vendors of polishing equipment.

One of the advantages of the structure 500 in FIG. 5 is that all fibers 200A–200C may be polished simultaneously. Once the ends of the fibers 200A–200C are polished, the wafer 202 in FIG. 5 may be separated into individual components, as shown in FIG. 6.

Figure 6:
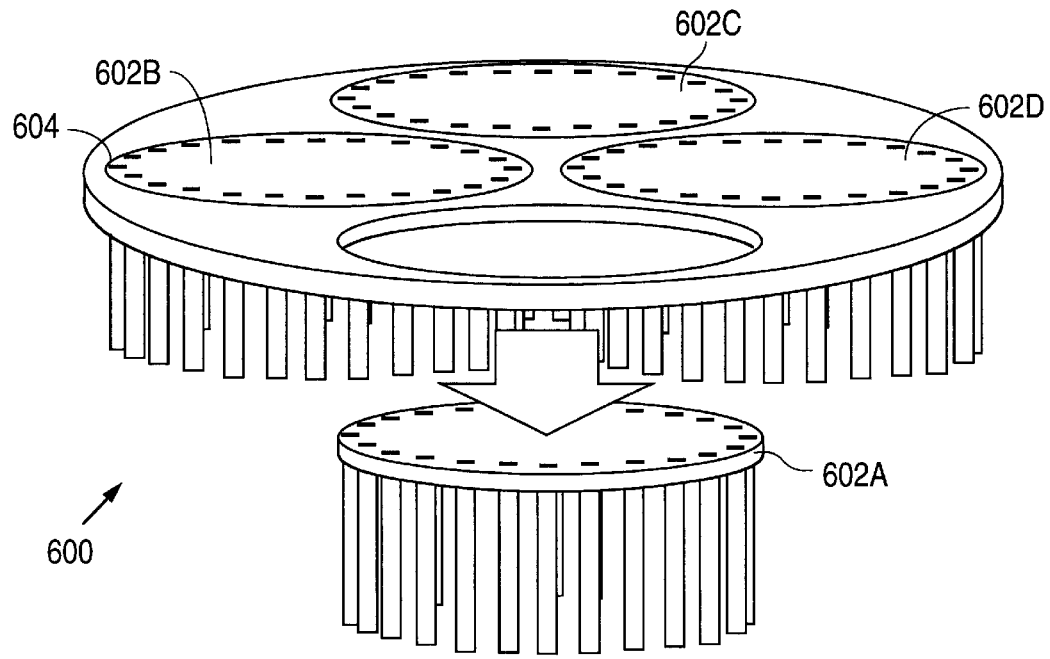
FIG. 6 illustrates one embodiment of a plurality of substrate components removed from a base substrate.

FIG. 6 illustrates one embodiment of a plurality of substrate components 602A–602D removed from a base substrate 604 (as shown by the arrow). The separation may be done by various methods, including but not limited to dicing with a diamond saw.

Figure 7:
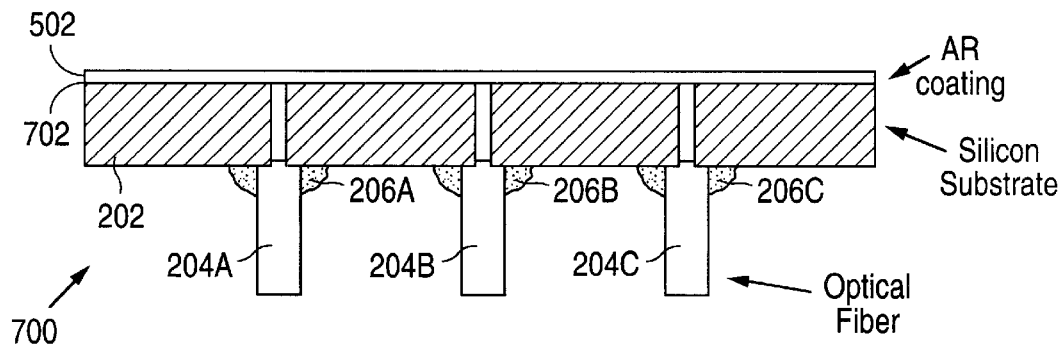
FIG. 7 illustrates one embodiment of a coating formed on one side of the substrate and fibers in FIG. 5.

FIG. 7 illustrates one embodiment of a coating 702 formed on the top side 502 of the substrate 202 and fibers 200A–200C in FIG. 5. In one embodiment, before separating the components 602A–602D (FIG. 6) and after polishing, an anti-reflection (AR) coating 702 is applied by depositing films of various materials on the top side 502 the silicon wafer 202 where the fiber ends have been polished. In one embodiment, the AR coating 702 uses multiple layers of dielectric materials, where the materials and designs may vary. Multiple layer dielectrics form interferometric effects, which are used to eliminate reflection from the surface 502 and provide almost 100% transmission.

In other embodiments, the coating 702 may comprise a chemically sensitive film for chemical sensors, or a metal coating for total reflection. The coating 702 is a way to make a sensor or to improve the optical characteristics of the fiber/ambient interface 502.

The processed substrates described above may be combined with microelectronic mechanical system (MEMS) components, such as small micro-machined movable mirrors and electronics. The MEMS components may be placed in recesses in the silicon wafer 202, as shown in FIG. 8, to prevent the MEMS components from being damaged during a polishing process.

Figure 8:
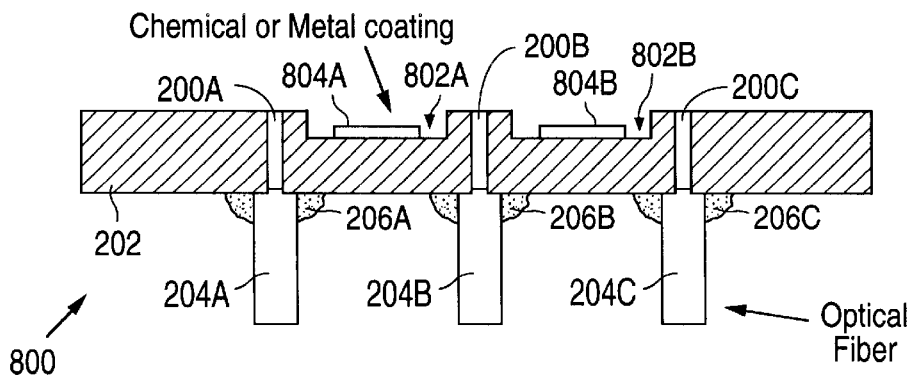
FIG. 8 illustrates one embodiment of the substrate in FIG. 5 with a plurality of MEMS components inserted in etched recesses.

FIG. 8 illustrates one embodiment of the substrate 202 in FIG. 5 with a plurality of MEMS components 804A, 804B inserted in etched recesses 802A, 802B. One advantage of the structure 800 in FIG. 8 is that the optical fibers 200A–200C are aligned to the MEMS components 804A, 804B using photolithography masking, which provides very good alignment. A single photolithographic mask may be used when the MEMS recesses 802A, 802B and the fiber holes in FIG. 8 are etched during the same etching process, such as deep reactive ion etching. A single photolithographic mask provides extremely high precision location positioning between all components. Masks written by electron-beam lithography typically have about 10 nanometer—100 nm accuracy in positioning the locations of features in the mask. The structure 800 in FIG. 8 may be used in fabricating a high density, MEMS fiber optic switch.

Figure 9:
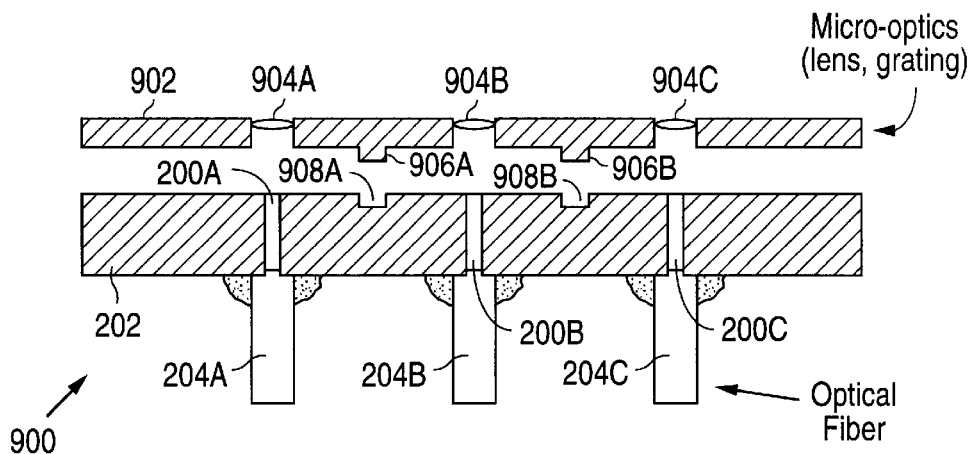
FIG. 9 illustrates one embodiment of the substrate in FIG. 5 with alignment notches, which are used to align the fiber array to a lens array.

FIG. 9 illustrates one embodiment of the substrate 202 in FIG. 5 with alignment notches 908A, 908B, which are used to align the fiber array 900 to a lens array 902. In one embodiment, the alignment notches 908A, 908B and the fiber holes in FIG. 9 are etched into the silicon wafer 202 during the same etching process, such as deep reactive ion etching. The alignment notches 908A, 908B are aligned with respect to the fiber holes in the substrate 202 with lithographic precision.

The lens array 902 in FIG. 9 comprises a plurality of lenses 904A–904C protruding stubs 906A, 906B, which are intended to fit into the notches 908A, 908B. In another embodiment, notches are etched into the lens array 902 and stubs are formed (e.g., by etching the surface of the substrate 202) in the fiber array 900. In other embodiments, instead of a lens array 902 with lenses 904A–904C as shown in FIG. 9, the lens array 902 may comprise diffraction gratings, MEMS components, or anything that a user desires to align with the fiber array 900.

The fiber terminators described herein may be used for connecting fibers, such as standard single fiber connectors. In addition, the photolithographic alignment techniques described herein may be advantageously used to align two fiber arrays. In one embodiment, alignment features are formed to register precisely between the two fiber connectors. For example, one connector may have a protruding feature, while another connector may have a recess feature. On each fiber connector, the alignment features are aligned with the fiber holes with lithographic precision. When the features of two connectors mate, the fibers of one connector are aligned with the fibers of the other connector with an accuracy of about one micron or better. Tight alignment tolerances are desired in order to have a low insertion loss in the connector.

In one embodiment, one fiber in one fiber array physically contacts a corresponding fiber in another array, such that there is no air gap between the fibers. An air gap produces a variable loss due to the resulting interferometric effects. Two possible implementations of aligned fiber arrays are shown in FIGS. 10 and 11.

Figure 10:
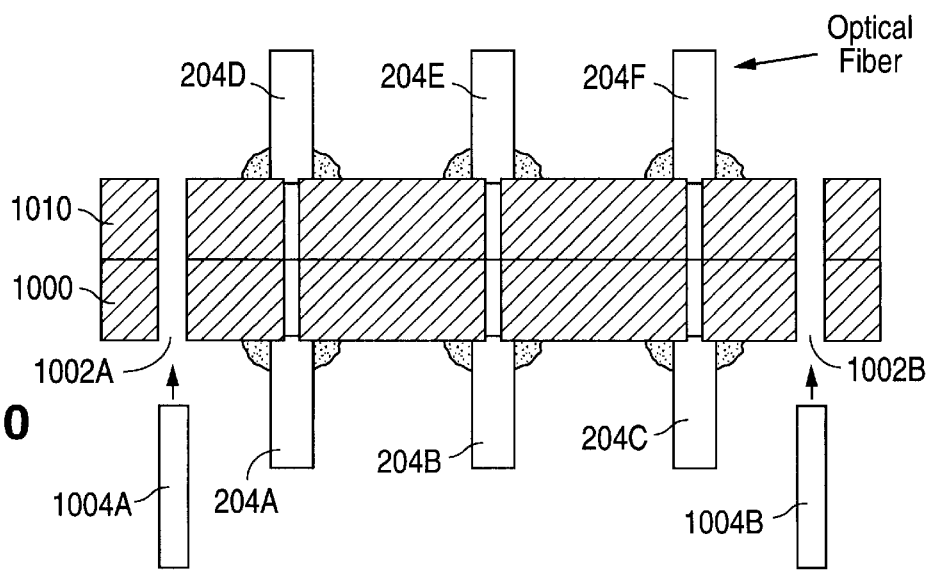
FIG. 10 illustrates one embodiment of two aligned fiber arrays.

FIG. 10 illustrates one embodiment of two aligned fiber arrays 1000, 1010. In FIG. 10, the fiber arrays 1000, 1010 are aligned by visually aligning holes 1002A, 1002B in the two wafers 1000, 1010 or using one or more pins 1004A, 1004B that would slide through the holes 1002A, 1002B.

Figure 11:
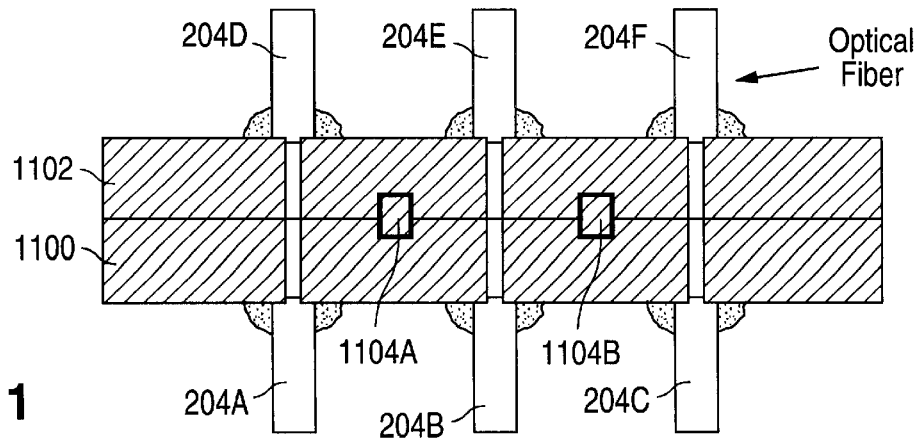
FIG. 11 illustrates another embodiment of two aligned fiber arrays.

FIG. 11 illustrates another embodiment of two aligned fiber arrays 1100, 1102. Wafer pieces 1104A, 1104B are patterned to fit in alignment groves etched into the two fiber wafers 1100, 1102.

Figure 13:
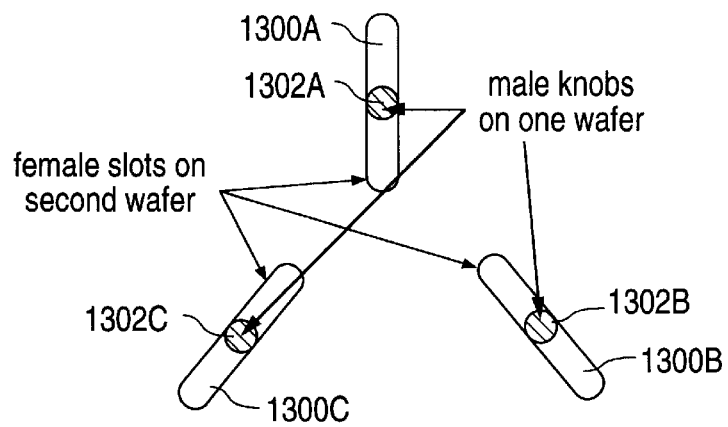
FIG. 13 illustrates a top view of another embodiment of kinematic alignment features between two fiber arrays.

FIG. 13 illustrates a top view of another embodiment of kinematic alignment features between two fiber arrays or wafers. In FIG. 13, three alignment slots or grooves 1300A–1300C are properly designed and etched into one silicon wafer. On another silicon wafer, three small knobs 1302A–1302C are formed that align into the three grooves 1300A–1300C, which have substantially the same width as the knobs 1302A–1302C but are longer.

In one embodiment, a plurality of holes are formed in a substrate 400 as in FIGS. 4A and 4B with a process other than deep reactive ion etching, and kinematic alignment flaps 404A–404F are formed in the substrate 400 with a process, such as deep reactive ion etching.

Figure 14:
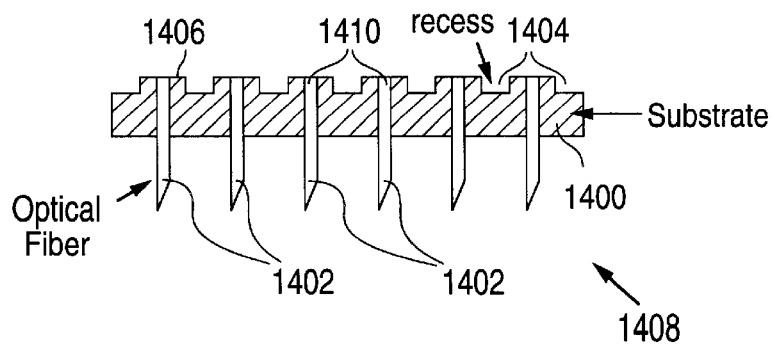
FIG. 14 illustrates one embodiment of a substrate with a plurality of etched holes and a plurality of recesses formed on one surface of the substrate.

FIG. 14 illustrates one embodiment of a fiber termination 1408 with a plurality of etched holes 1410 and a plurality of recesses 1404 formed on one side 1406 of the substrate 1400. The holes 1410 are etched with one or more processes as described above. The recesses 1404 are formed by removing material from selected parts of the 'front' side 1406 of the substrate 1400. The recesses 1404 may be formed by wet etching, plasma etching, laser ablation, sand blasting or some other suitable method. In one embodiment, substrate material is removed everywhere on the front side 1406 of the substrate 1400 except a ring of substrate material around each hole 1410. In one embodiment, the recesses 1404 are formed before a plurality of fibers 1402 are inserted in the holes 1410.

In one embodiment, after the fibers 1402 are inserted in the holes 1410, the front side 1406 of the substrate 1400 and the fiber ends are polished. With the recesses 1404 on the front side 1406, a relatively small amount of substrate material (e.g., the rings) located around the fibers 1402 is polished with the fiber ends. Thus, the substrate 1400 with recesses 1404 allows more uniform polishing of the ends of the fibers 1402 and less wear of the polishing surface.

In addition, the substrate 1400 with recesses 1404 facilitates the physical connection of two fiber connectors, as shown in FIGS. 10 and 11. When pressure is applied between the two connectors, the pressure is located near the fiber ends to provide low insertion loss.

The above-described embodiments of the present invention are merely meant to be illustrative and not limiting. Various changes and modifications may be made without departing from the invention in its broader aspects. The appended claims encompass such changes and modifications within the spirit and scope of the invention.

What is claimed is:

1. A method of making an optical fiber terminator, the method comprising:
   using deep reactive ion etching to etch a plurality of holes through a silicon substrate, wherein each hole is sized to fit an optical fiber;
   placing an optical fiber in at least one hole;
   removing portions of the fibers such that one end of each fiber is substantially even with one side of the substrate;
   polishing a surface of the ends of the fibers and the side of the substrate that are substantially even; and
   forming a coating on the surface of the ends of the fibers and the side of the substrate that are substantially even.

2. The method of claim 1, further comprising using photolithography masking before the etching to position the holes.

3. The method of claim 1, wherein at least one hole is formed to allow angled insertion of a fiber.

4. The method of claim 1, wherein the substrate is more than 200 microns thick.

5. The method of claim 1, wherein at least two holes are about 10 to about 140 microns in diameter.

6. The method of claim 1, wherein the coating comprises an anti-reflective coating on the surface of the ends of the fibers and the side of the substrate that are substantially even.

7. The method of claim 1, wherein the coating comprises a chemically sensitive film coating on the surface of the ends of the fibers and the side of the substrate that are substantially even.

8. The method of claim 1, wherein the coating comprises a metal coating for reflection on the surface of the ends of the fibers and the side of the substrate that are substantially even.

9. The method of claim 1, further comprising gluing an optical fiber in a hole in the substrate.

10. An optical fiber terminator comprising:
    a silicon substrate with a plurality of through holes formed by deep reactive ion etching, wherein each hole is sized to fit an optical fiber;
    at least one optical fiber inserted in a through hole, an end of the optical fiber being substantially even with a side of the silicon substrate; and
    an optical coating deposited over the end of the fiber and the side of the substrate that are substantially even.

11. The terminator of claim 10, wherein at least one hole is formed to allow angled insertion of a fiber.

* * * * *